United States Patent
Franklin et al.

(10) Patent No.: US 10,296,767 B2
(45) Date of Patent: May 21, 2019

(54) METHOD AND APPARATUS OF PROVIDING REAL-TIME FEEDBACK FOR MAGNETIC SECURE TRANSMISSION

(71) Applicant: Tabletop Media LLC, Dallas, TX (US)

(72) Inventors: Vernon Franklin, Midlothian, TX (US); Viren R. Balar, Allen, TX (US)

(73) Assignee: Tabletop Media LLC, Dallas, TX (US)

( * ) Notice: Subject to any disclaimer, the term of this patent is extended or adjusted under 35 U.S.C. 154(b) by 10 days.

(21) Appl. No.: 15/809,916

(22) Filed: Nov. 10, 2017

(65) Prior Publication Data

US 2018/0150658 A1 May 31, 2018

Related U.S. Application Data

(60) Provisional application No. 62/420,054, filed on Nov. 10, 2016.

(51) Int. Cl.
*G06K 7/08* (2006.01)

(52) U.S. Cl.
CPC .................................. *G06K 7/087* (2013.01)

(58) Field of Classification Search
CPC .... G06K 7/087; G06Q 20/202; G06Q 20/204; G06Q 20/341
See application file for complete search history.

(56) References Cited

U.S. PATENT DOCUMENTS

| | | | |
|---|---|---|---|
| 2016/0210616 A1* | 7/2016 | Lee .................... | G06Q 20/3278 |
| 2016/0253651 A1* | 9/2016 | Park ....................... | G07F 9/023 705/39 |
| 2017/0053264 A1* | 2/2017 | Maung ................. | G06Q 20/341 |
| 2017/0278103 A1* | 9/2017 | Cheong .............. | G06Q 20/3276 |

* cited by examiner

*Primary Examiner* — Laura A Gudorf

(57) ABSTRACT

A user terminal comprising: i) a display module comprising a display screen and an interface circuitry for receiving a user input; and ii) a magnetic stripe reader configured to detect a magnetic secure transmission (MST) signal received by the user terminal and, in response to the detection, to launch a real-time application in the user terminal. In one embodiment, the real-time application displays a message on the display module of the user terminal. In another embodiment, the real-time application transmits data to a third-party vendor associated with the MST signal.

6 Claims, 5 Drawing Sheets

Swipe on a Ziosk of Credit Card A:
%B474472***6701^JOHN/DOE^1704*********
***************?;474472*6701=1704***********
***?|0200|

FIG. 4A     400

SamsungPay Tap of Credit Card A:
%465820050005228=20041018375000002800?;465820050005228=20041018375
000002800?+465820050005228=20041018375000002800?

METHOD AND APPARATUS OF PROVIDING REAL-TIME FEEDBACK FOR MAGNETIC SECURE TRANSMISSION

CROSS-REFERENCE TO RELATED APPLICATION(S) AND CLAIM OF PRIORITY

The present application is related to U.S. Provisional Patent No. 62/420,054, filed Nov. 10, 2017, entitled "Method And Apparatus Of Providing Real-Time Feedback For Magnetic Secure Transmission". Provisional Patent No. 62/420,054 is assigned to the assignee of the present application and is hereby incorporated by reference into the present application as if fully set forth herein. The present application hereby claims priority under 35 U.S.C. § 119(e) to U.S. Provisional Patent No. 62/420,054.

TECHNICAL FIELD

The present application related generally to magnetic card swipe terminals.

BACKGROUND

Mobile payment is an emerging technology that seeks to replace cash and conventional credit cards with mobile technology. Most mobile payment systems, however, rely on similar features. Android devices implement various mobile payment mechanisms, such as Android Pay, Samsung Pay, and Chase Pay, and iPhones implement Apple Pay. Android Pay and Apple Pay both rely on the near field communication (NFC) standard to communicate with payment terminals. However, this requires retailers to upgrade their hardware to accept contactless payments.

To make mobile payments backwardly compatible with conventional magnetic swipe terminals, Samsung introduced magnetic secure transmission (MST) technology, called Samsung Pay, to complement the NFC technology in Samsung smartphones. Samsung Pay technology supports magnetic secure transmission (MST) as well as NFC transmissions. This means a mobile device with Samsung Pay works with any payment terminal that accepts contactless payments with NFC or the more traditional method of swiping a payment card through the magnetic stripe reader. Samsung Pay uses a circuit in the mobile device that transmits an electro-magnetic signal that simulates the swiping of a physical payment card in the magnetic stripe reader. Thus, when a Samsung device is placed close to a conventional payment card terminal and Samsung Pay is activated, the magnetic stripe reader on the terminal communicates with the mobile device via electro-magnetic signals and payment data is received as if a physical payment card had been swiped.

However, magnetic secure transmission (MST)-based technology has not been fully exploited beyond the simple payment operations. There is a need for applications of MST-based technology that enable the operator of the magnetic card swipe reader (i.e., the merchant) to provide real-time feedback to the manufacturer of the MST-enabled device or to the payment processing company (i.e., acquirer).

SUMMARY

To address the above-discussed deficiencies of the prior art, it is a primary object to provide a user terminal comprising: i) a display module comprising a display screen and an interface circuitry for receiving a user input; and ii) a magnetic stripe reader configured to detect a magnetic secure transmission (MST) signal received by the user terminal and, in response to the detection, to launch a real-time application in the user terminal. In one embodiment, the real-time application displays a message on the display module of the user terminal. In another embodiment, the real-time application transmits data to a third-party vendor associated with the MST signal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4A illustrates the data read by the exemplary user terminal when reading a conventional physical payment card (e.g., credit card) that is swiped through the magnetic card reader.

FIG. 4B illustrates the data read on three tracks by the exemplary user terminal when reading an MST-based signal from a mobile device that is held close to the magnetic card reader.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable user interface terminal.

The present invention takes advantage of the unique properties of magnetic secure transmission (MST) to provide a method of detecting the use of MST-based technology (such as Samsung Pay) in a magnetic card swipe reader. This enables the operator of the magnetic card swipe reader (i.e., the merchant) to provide real-time feedback to the manufacturer of the MST-enabled device or to the payment processing company (i.e., acquirer). By way of example, if a magnetic card swipe reader enabled by the present invention determines that Samsung Pay is being used in place of a physical payment card, the merchant may program the payment terminal to offer a discount off the amount due for the use of Samsung Pay.

A payment terminal according to the present invention provides a number of enhanced features that are not available in conventional payment card reader terminals. For example, during the checkout process, the payment terminal may identify an MST-based transaction (i.e., use of Samsung Pay on a mobile phone) and add a discount to the bill in real-time. After checkout (i.e., post transaction reporting), the payment terminal may track and record the number of an MST-based transactions and track customer satisfaction associated with MST-based transactions vs. payment card transactions.

Figure 1:
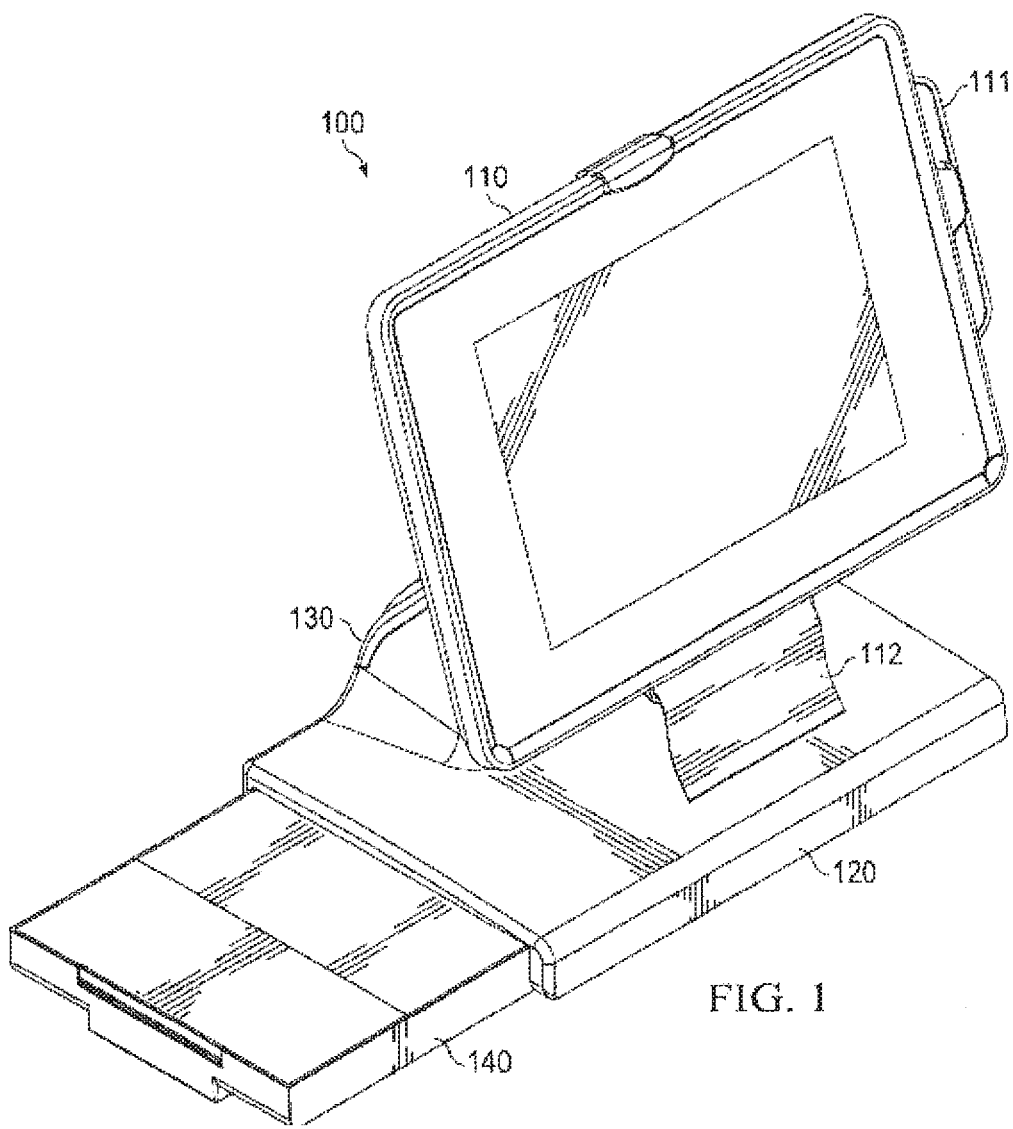
FIG. 1 is a perspective view of an exemplary user terminal in accordance with one embodiment of the disclosure.

FIG. 1 is a perspective view of exemplary user terminal 100 in accordance with one embodiment of the disclosure. User terminal 100 comprises display module 110, base 120, support 130, and removable battery module 140. For ease of explanation, battery module 140 is shown partially removed from base 120. Base 120 is typically placed on a countertop or a tabletop and support 130 holds display module 110 in an elevated position with the display screen inclined to make viewing easy. In some embodiments, display module 110 may comprise card swipe device 111 and an internal thermal printer (not shown) that prints receipt 112 for a customer. In accordance with the teaching of the present disclosure, card swipe device 111 may include a conventional magnetic stripe reader that reads a physical payment card (credit or debit) that is swiped through the magnetic stripe reader. Card swipe device 111 may further include a magnetic secure transmission (MST) transceiver capable of communicating with the MST-based technology (e.g., Samsung Pay) in a mobile device that is proximate the card swipe device 111.

By way of example, user terminal 100 may be a Ziosk terminal that is provided by Tabletop Media LLC. The Ziosk terminal has a touch screen for interfacing with a user and a magnetic stripe card reader which is visible and accessible on the side of the Ziosk terminal. The Ziosk terminal may also comprise an NFC transceiver capable of providing contactless payments with the guests.

Figure 2:
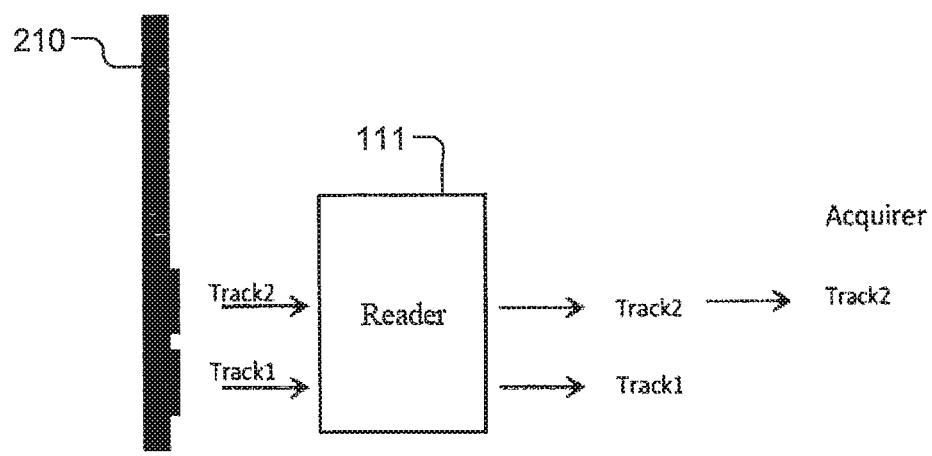
FIG. 2 illustrates the operation of an exemplary user terminal that is reading a conventional physical payment card (e.g., credit card) that is swiped through the magnetic card reader in accordance with one embodiment of the prior art.

FIG. 2 illustrates the operation of user terminal 100 when reading conventional physical payment card 210 (e.g., credit card) that is swiped through the magnetic stripe reader of card swipe device 111. Physical payment cards have multiple magnetic stripes (e.g., Track1, Track2) that are encoded with information. The magnetic stripe reader typically has the capability of reading three independent tracks of data from the payment card. In conventional credit cards and debit cards, the Track1 data and the Track2 data are different. The Track2 data is the important payment information that is sent to an "Acquirer", which is typically a bank or credit card company.

Figure 3:
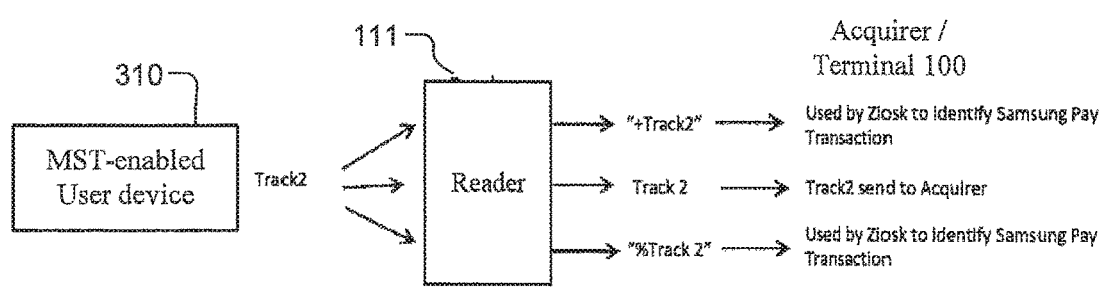
FIG. 3 illustrates the operation of an exemplary user terminal that is reading a magnetic secure transmission (MST)-based signal from a mobile device that is held close to the magnetic card reader.

FIG. 3 illustrates the operation of user terminal 100 when reading an MST-based signal (e.g., Samsung Pay) from user device 310 (e.g., a mobile device) that is held close to the magnetic stripe reader of card swipe device 111. The mobile device 310 enabled with Samsung Pay or another MST application broadcasts the Track2 information as an electromagnetic signal that is detected by the magnetic stripe reader. The Track2 data that is seen as redundant information on all three tracks read by the magnetic stripe reader is used by user terminal 100 to identify that a Samsung Pay transaction or another similar magnetic secure transmission (MST) transaction has occurred. As before, the Track2 data is the important payment information that is sent to an Acquirer.

FIG. 4A illustrates the data read by user terminal 100 when reading a conventional physical payment card (e.g., credit card) that is swiped through the magnetic stripe reader. It is noted that the data from a physical payment card begins with the "% B" character sequence identifying it as a payment card.

FIG. 4B illustrates the data read on three tracks of user terminal 100 when reading an MST-based signal, such as Samsung Pay, from a mobile device that is held close to the magnetic stripe reader. The same data is read on all three tracks and the data does not begin with the "% B" character sequence. The detection logic for identifying a Samsung Pay transaction or another MST-based transmission in a conventional magnetic stripe reader is as follows. If there is no error in the Track1 data and the Track1 data does not start with a "% B" character sequence, then the card is a non-financial card (e.g., loyalty program card). Additionally, if the Track 3 data is the same as the Track1 and Track2 data, then there is no physical card present, but rather a Samsung Pay electro-magnetic signal or other MST signal has been received.

Figure 5:
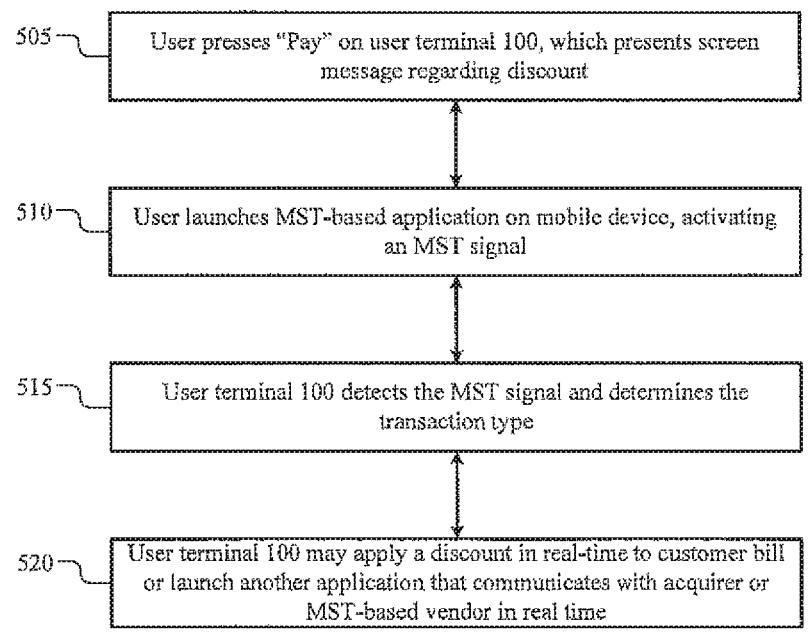
FIG. 5 illustrates a method of generating a customer incentive in the exemplary user terminal that reads an MST-based signal from a mobile device that is held close to the magnetic card reader.

FIG. 5 illustrates the launching on an application on user terminal 100 that detects an MST-based signal from a mobile device that is held close to the magnetic stripe reader of card swipe device 111. In 505, a terminal user (i.e., Guest) presses "Pay" on user terminal 100, which presents screen message regarding a discount. For example, user terminal 100 may display the message "Get $5 off for using Samsung Pay now". In 510, the user launches an MST-based application (i.e., Samsung Pay) on the mobile device, which activates an MST signal, and holds the mobile device near the magnetic stripe reader. In 515, user terminal 100 detects the MST signal and uses the Track1/2/3 data to determine the Transaction Type (e.g., a physical credit/debit card payment process, a physical loyalty card process, or an MST-based payment process). In the example, user device 111 determines that a Samsung Pay transaction is occurring based on the magnetic stripe data, as explained above, in FIG. 4B.

In 520, user terminal 100 may apply a $5 off discount to the customer bill in real time. By way of example, user terminal 100 may apply an instant coupon (e.g., discount PLU preprogrammed by restaurant and point of sale (POS) by terminal). The POS user terminal 100 applies an instant credit to the check and applies payment to the check via an authorization response. Additionally, other real-time applications may be executed by user terminal 100 in response to detecting an MST-based payment process. For example, user terminal 100 may launch a survey application that provides real-time feedback to the MST-based technology vendor (e.g., Samsung Pay). In response, user terminal 100 may receive information in real-time from the MST-based technology vendor, such as personalized messages to be displayed to the user.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user terminal comprising:
a display module comprising a display screen and an interface circuitry for receiving a user input; and
a card swipe device comprising:
a magnetic stripe reader configured to read a physical payment card and to detect therefrom three tracks of data comprising Track1 data, Track2 data, and Track3 data, wherein the magnetic stripe reader is further configured to detect a magnetic secure transmission (MST) signal received by the magnetic stripe reader from an external wireless device and to determine whether the received MST signal comprises Track1 data, Track2 data, and Track3 data and wherein the magnetic stripe reader, in response to a determination that the received MST signal comprises Track1 data, Track2 data, and Track3 data, is further configured to determine if the Track1 data, the Track2 data, and the Track3 data are identical.

2. The user terminal as set forth in claim 1, wherein the magnetic stripe reader, in response to a determination that the Track1 data, the Track2 data, and the Track3 data are identical, is further configured to determine if the Track1 data, the Track2 data, and the Track3 data begin with the character sequence "% B".

3. The user terminal as set forth in claim 2, wherein the magnetic stripe reader, in response to a determination that the Track1 data, the Track2 data, and the Track3 data begin with the character sequence "% B", determines that an MST-based payment process has occurred and is further configured to cause the user terminal to communicate with a server other than a bank server or a credit card company server.

4. The user terminal as set forth in claim 2, wherein the magnetic stripe reader causes the user terminal to communicate with a server associated with the external wireless device.

5. The user terminal as set forth in claim 1, wherein the magnetic stripe reader, in response to a determination that the Track1 data and the Track2 data are not identical, is further configured to determine if the Track2 data begins with the character sequence "% B".

6. The user terminal as set forth in claim 5, wherein the magnetic stripe reader, in response to a determination that the Track2 data begins with the character sequence "% B", determines that a physical payment card has been read by the magnetic strip reader and is further configured to cause the user terminal to communicate with a bank server or a credit card company server.

* * * * *